Figure 1:
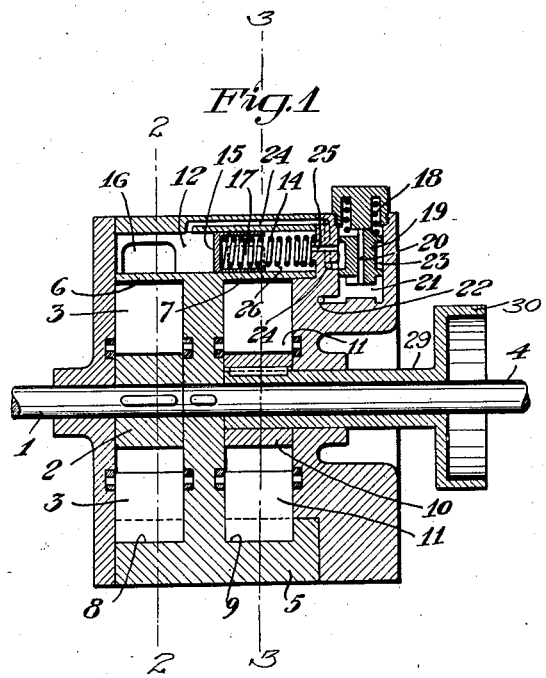

July 24, 1928.

S. G. WINGQUIST 1,677,996

HYDRAULIC CHANGE SPEED GEAR

Filed Jan. 24, 1924     3 Sheets-Sheet 1

Inventor:
Sven Gustaf Wingquist
By Attorneys,
Fraser, Myers + Manley.

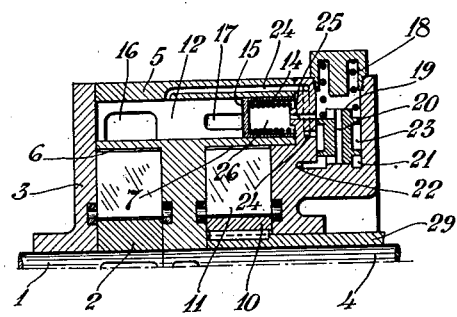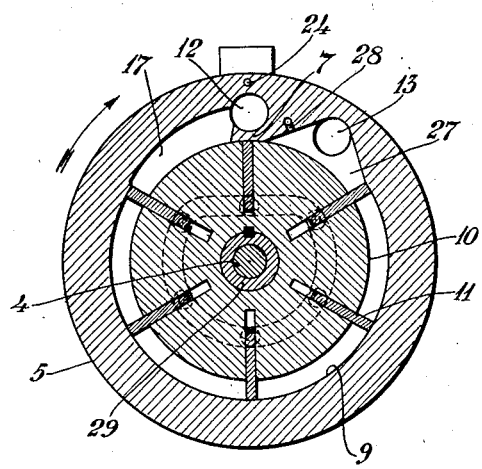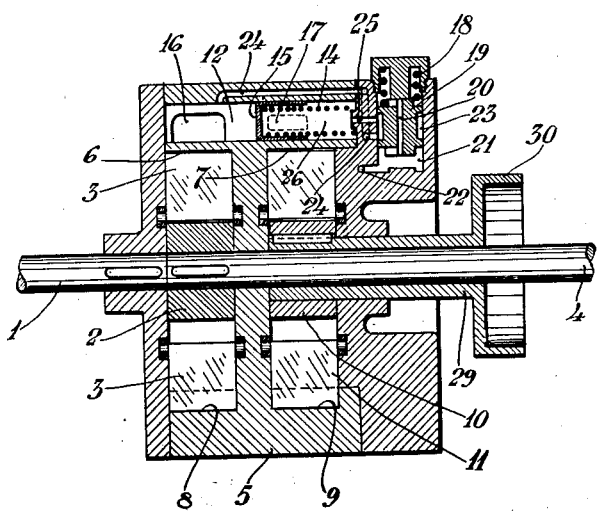

July 24, 1928.  
S. G. WINGQUIST  
1,677,996  
HYDRAULIC CHANGE SPEED GEAR  
Filed Jan. 24, 1924  3 Sheets-Sheet 3
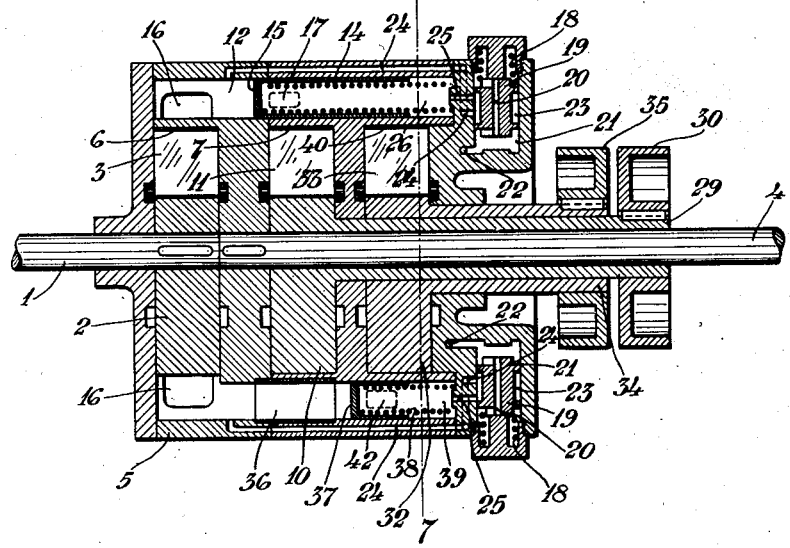
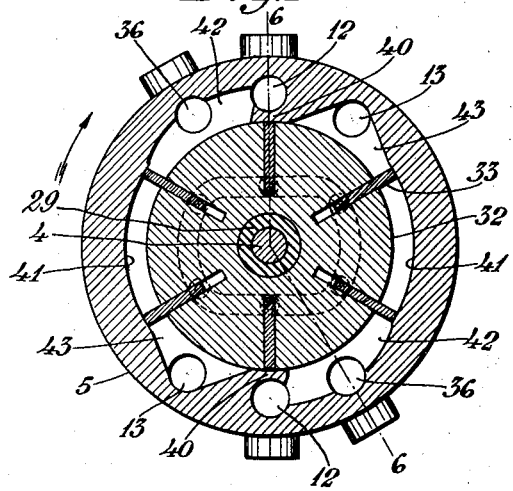
Inventor:
Sven Gustaf Wingquist
By Attorneys
Fraser, Myers & Manley Patented July 24, 1928.

1,677,996

UNITED STATES PATENT OFFICE.

SVEN GUSTAF WINGQUIST, OF GOTTENBORG, SWEDEN.

HYDRAULIC CHANGE-SPEED GEAR.

Application filed January 24, 1924, Serial No. 688,248, and in Sweden February 28, 1923.

This invention relates to hydraulic change speed gears, comprising two or more pump elements or systems of pump elements and in which valves are arranged in the pressure channels leading between the said pump elements, said valves being controlled directly or indirectly by the fluid pressure against the action of springs or the like so that the valves will be adjusted for different steps of coupling automatically on alterations of the said pressure. The object of the invention is to effect automatically, on exceeding a certain number of revolutions and without regard to the fluid pressure, a cutting out of one or more or all coupled pump elements, thereby providing for a decreased transmission ratio between the driving and driven parts of the gear or, if desired, a direct coupling between the said parts.
Thus the risk of wear and breakage of the relatively moving parts of the gear due to excessive speeds is decreased or avoided, since on cutting out a pump element and releasing the stator of said element no relative movement whatever occurs between the different parts of such pump element.

The arrangement of the pumping systems and method of releasing the transmission stator shown and described herein form the subject-matter of my United States Patents No. 1,603,179, granted October 12, 1926, and No. 1,599,626, granted September 14, 1926. Certain other features of the present device are claimed in my United States Patents Nos. 1,503,618, granted August 5, 1924, 1,610,406, granted December 4, 1926, and 1,510,368, granted September 30, 1924; also in my co-pending applications Serial Nos. 575,673, filed July 17, 1922, and 621,577, filed February 27, 1923 and allowed December 23, 1927.

According to the present invention there is arranged in combination with the valve or valves controlled by fluid pressure, one or more auxiliary valves controlled directly or indirectly by centrifugal force against the action of springs or the like, said latter valve or valves being so devised as to automatically alter the hydraulic control upon the pressure controlled valve or valves, on exceeding a certain number of revolutions per minute of the driven or driving parts of the change speed gear, so that the last mentioned valve or valves are caused to take up the position, in which the corresponding pump element is cut out.

Figure 2:
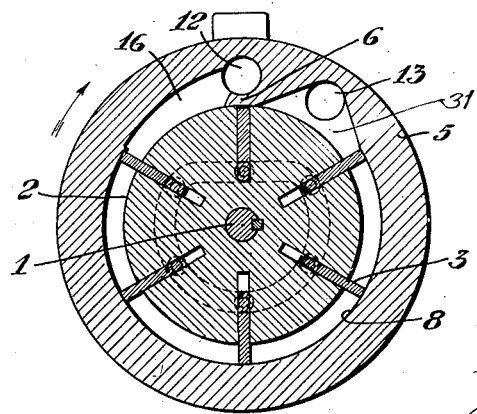

In the accompanying drawing several forms of embodiment of a hydraulic change speed gear according to the invention are shown. Fig. 1 is an axial section of the change speed gear. Fig. 2 is a cross-section taken on the line 2—2 of Fig. 1. Fig. 3 is a cross-section taken on the line 3—3 of Fig. 1. Fig. 4 is a fragmentary sectional view similar to that of Fig. 1, but showing the control valve in its other end position. Fig. 5 is an axial section of a somewhat modified form of change speed gear. Fig. 6 is an axial section of a further modification taken on the broken line 6—6 of Fig. 7, which shows a change speed gear adapted for three steps of coupling. Fig. 7 is a cross-section taken on line 7—7 of Fig. 6.

Referring to Figs. 1 to 4 the change speed gear, which is shown as having two steps of coupling, viz, direct coupling and one transmission ratio, consists partly of a rotor 2 rigidly connected to a driving shaft 1 and having radially movable working vanes 3, partly of a rotor 5 rigidly connected to a driven shaft 4 and formed as a closed casing having abutments 6 and 7 and working surfaces 8 and 9, and partly of a stator 10 keyed to a sleeve 29 having a brake wheel 30 which is held stationary when the gear is adjusted for a transmission ratio, said stator having, as has the rotor 2, radially movable working vanes 11. The rotor 2 with its working vanes 3 and the rotor 5 with the abutment 6 and the working surface 8, on the one hand, and the stator 10 with its working vanes 11 and the rotor 5 with the abutment 7 and the working surface 9, on the other hand, form each, a sliding vane pump device, and arranged between the pressure chambers 16 and 17 and the suction chambers 31 and 27 respectively of the said two pump devices 2, 5 and 5, 10 is a pressure channel 12 and a suction or idle fluid channel 13. The direction of rotation of the driving rotor 2 is supposed to be that shown by the arrow in Fig. 2. Since the said suction chambers 31 and 27 are permanently connected by the channel 13, said chambers together with said channel may be considered as a common suction chamber of the change speed gear.

As to the general action of hydraulic change speed gear according to the above-mentioned principle the following is to be observed.

Assuming the driving shaft 1 with the rotor 2 to be rotated in the direction of the arrow shown in Fig. 2 and assuming, further, the pressure channel 12 between the chambers 16 and 17 to be shut off and, thus no escape of fluid can take place from the pump 2, 5 serving as a delivery pump to the pump 5, 10 serving as a receiving pump, the rotor 5 with its shaft 4 will be driven in the same direction and with the same speed as the rotor 2, due to the fluid in the pressure chamber 16 of the delivery pump 2, 5 being entirely trapped between the abutment 6 and the adjacent vane 3, the brake wheel 30 being at this time released, so that the stator 10 can rotate freely with the two rotors 2 and 5.

If, then, the pressure channel 12 be opened and the stator 10 be checked by the brake wheel 30, the fluid will pass from the pressure chamber 16 of the delivery pump 2, 5 to the pressure chamber 17 of the receiving pump 5, 10 and from there to the suction chamber 27 of said last-mentioned pump 5, 10 through the channel 13 to the suction chamber 31 of the delivery pump 2, 5, a circulation of the fluid taking place thus between the said two pumps. The driven rotor 5 will thereby obtain a slip relatively to the driving rotor 2 corresponding to the ratio between the volumetric capacities of the two pumps and its torque will be increased correspondingly, due to the fluid pressure set up in the pressure chamber 17 of the pump 5, 10 and affording a reaction force on the abutment 7 of the driven rotor 5, the pressure in the chamber 16 of the delivery pump 2, 5 being, obviously, dependent on the load to be driven.

Disposed in the pressure channel 12 between the two pump devices is a valve 15 controlled directly by the fluid pressure against the action of a spring 14, said valve being automatically moved in the direction from the left to the right in Fig. 1 against the action of the spring 14, when the pressure has reached a certain value, i. e. at a certain turning moment of the driven shaft 4, and effecting a connection between the pressure chambers 16 and 17, respectively, of the two pump devices 2, 5 and 5, 10 and, thus, causing a transmission ratio between the shafts 1 and 4, said transmission ratio depending as mentioned on the relation between the volumetric capacities of the two pump devices.

Arranged in the driven rotor 5 is, according to the invention in the form of embodiment shown, an auxiliary or pilot valve 19 controlled directly by the centrifugal force against the action of a spring 18 and having a channel 20 passing centrally, the chamber 21 on the inside of the valve 19 being connected by a channel 22 with the above-mentioned common suction chamber of the change speed gear as indicated at 28 in Fig. 3. An annular chamber 23 formed by the auxiliary valve 19 and its seat is connected by a channel device 24 with the pressure channel 12 of the gear and, in the valve position shown in Fig. 1, is further connected with the chamber 26 on the inside of the pressure controlled valve 15 by a channel 25.

Provided that the number of revolutions per minute of the driven rotor 5 be lower than that at which the centrifugal force exerted by the valve 19 exceeds the tension of the spring 18, the valve 19 will occupy its inner limit position (Fig. 4), and the chamber 26 on the inside of the pressure controlled valve 15 will be connected with the suction or idle fluid chamber of the gear by the channel 25, the channel 20 in the valve 19, the chamber 21 and the channel 22. Thus, the valve 15 is exposed to the fluid pressure at the outside only. If now the load of the driven shaft 4 be increased, also the pressure in the pressure chamber 16 of the pump device 2, 5 will increase and exceeds at a certain value the tension of the spring 14 so that, as hereinbefore described, the valve 15 will be moved in the direction from the left to the right in Fig. 1 and bring about a connection between the two pump devices and, thus, a transmission ratio.

If then the number of revolutions per minute of the driving shaft 1 and, consequently, also of the driven shaft 4 with the rotor 5 be increased, the centrifugal force exerted by the valve 19 will also increase and exceeds at a certain value, i. e. at a certain number of revolutions per minute (which obviously may be determined at will by suitably choosing the tension of the spring 18 and the weight of the valve 19) the tension of the spring 18 so that the valve 19 will be moved to its outer position as shown in Fig. 1. In this case a connection is brought about between the pressure channel 12 and the chamber 26 on the inside of the valve 15 through the channel device 24, the annular chamber 23 and the channel 25. Thus, the valve 15 will be substantially balanced by the opposing fluid pressure and consequently will be moved by the action of the spring 14. independently of the magnitude of the load of the shaft 4, to the position shown in Fig. 1 in which the connection between the two pressure chambers 16 and 17 of the two pump devices is cut off and, consequently, a direct coupling is effected between the shafts 1 and 4. In this case the stator 10 should be released in any suitable manner so as to freely rotate with the two rotors 2 and 5, rotating at the same speed, a relative movement between the several parts of the change speed gear being thereby wholly avoided. A simple means of releasing the stator is shown and claimed in my United States Patent No. 1,510,368, issued September 30, 1924.

In the example shown, it is assumed that the valve 19 is disposed in the driven rotor 5 and, thus, that its action is dependent on the number of revolutions per minute of said rotor. However, the shaft 1 may obviously, without difficulty, be connected to the rotor 5 and the shaft 4 to the rotor 2 as shown in Fig. 5, the rotor 5 being in this case driving instead of driven and the action of the valve 19 being, consequently, directly dependent on the number of revolutions per minute of the driving shaft 1 instead of on the number of revolutions per minute of the driven shaft 4.

The form of embodiment according to Figs. 6 and 7 differs from that according to Figs. 1 to 4 in this respect only that a second receiving pump has been added, said pump comprising the stator 32 having the radially movable vanes 33 and being connected by a sleeve 34, rotatable with relation to the sleeve 29, with a second brake wheel 35. Leading between the pressure chambers 16 of the delivery pump 2, 5 and the pressure chambers 42 of the second receiving pump 5, 32 there are, similarly to the channels 12, channels 36 containing valves 37 (only one visible in Fig. 6) acted on in the one direction by the fluid pressure in the pressure chamber 16 of the delivery pump 2, 5 and in the opposite direction by a spring 38, just as is the valve 15 in the pressure channels 12, the chamber 39 at the inside of the said valve 37 being exposed to the fluid pressure or relieved from said pressure by means of an auxiliary valve device 18, 19 in exactly the same manner as described with relation to the chamber 26 at the inside of the pressure controlled valve 15. Besides, there are provided in the common driven rotor 5 a further set of abutments 40 and working surfaces 41. The suction chambers 43 are permanently connected to the suction chambers 27 and 31 (not visible in Figs. 6 and 7) by the channels 13, said chambers 43, 27 and 31 and the channel 13 thus forming a common suction chamber of the change speed gear. As apparent particularly from Fig. 7, there are provided two abutments 40 and two working surfaces 41 for the pump 5, 32, the two other pumps 2, 5 and 5, 10 being similarly constructed and, consequently, each of the three pumps will have two pressure chambers and two suction chambers, whereas according to Figs. 1 to 4 each pump has but one abutment and one working surface and, consequently, but one pressure chamber and one suction chamber.

For the rest, the construction and the action of the change speed gear according to Figs. 6 and 7 is exactly the same as that of the gear according to Figs. 1 to 4, with the difference that, obviously, the pressure controlled valves 15 and 37 have to act at different pressures, so that one of the receiving pumps will be cut in at a certain pressure and both receiving pumps at a certain higher pressure. Similarly, the auxiliary valves 19 controlling the several valves 15 and 37 may also, for instance by suitably choosing the tension of the springs 18, be brought to act at different speeds of rotation of the rotor 5, so that on reaching a certain number of revolutions per minute of the rotor 5 for instance the first receiving pump 5, 10 will be automatically cut out, as described, and on reaching a certain higher speed also the receiving pump 5, 32 will be cut out. However, the said valves 19 may, obviously, act simultaneously, so that both receiving pumps will be automatically cut out at the same number of revolutions per minute. In this case but one auxiliary valve 19 may suffice for the control of all pressure actuated valves 15 and 37 by simply connecting the channels 25 with each other, i. e. by bringing all of the chambers 26 and 39 at the inside of the pressure controlled valves 15 and 37 into communication with a single channel 25 controlled by an auxiliary valve 19.

What I claim as new and desire to secure by Letters Patent of the United States of America is:—

1. A hydraulic change speed gear, comprising a rotary delivery pump device and a rotary receiving pump device, each of said pump devices comprising at least one pump element, at least one pressure channel forming a communication between said delivery pump device and said receiving pump device, a valve disposed in said pressure channel and controlled by the fluid pressure set up in said delivery pump device in overcoming the load to be driven and tending to open said valve, a spring device tending to close said valve, and means for automatically altering the hydraulic control of said valve when one of the rotary members of the change speed gear exceeds a certain speed, so that said valve is caused by the said spring device to take up its closed position, said means comprising a valve device controlled by centrifugal force and by a spring device.

2. A hydraulic change speed gear, comprising a rotary delivery pump device and a rotary receiving pump device, each of said pump devices comprising at least one pump element, at least one pressure channel forming a communication between said delivery pump device and said receiving pump device, a valve disposed in said pressure channel and controlled directly by the fluid pressure set up in said delivery pump device in overcoming the load to be driven and tending to open said valve, a spring device tending to close said valve, and means for automatically altering the said hydraulic control of said valve when one of the rotary members of the change speed gear exceeds a certain speed, so that said valve is caused by the said spring device to take up its closed position, said means comprising a valve device controlled directly by centrifugal force and by a spring element.

3. A hydraulic change speed gear, comprising a driving rotor, a driven rotor and a stator, said driving and driven rotors forming a rotary delivery pump device and one of said rotors and said stator forming a rotary receiving pump device, each of said pump devices comprising at least one pump element, at least one pressure channel forming a communication between said delivery pump device and said receiving pump device, a valve disposed in said pressure channel and controlled by the fluid pressure set up in said delivery pump device in overcoming the load to be driven and tending to open said valve, a spring device tending to close said valve, and means for automatically altering the said hydraulic control of said valve when one of the rotary members of the change speed gear exceeds a certain speed, so that said valve is caused by the said spring device to take up its closed position, said means comprising a valve device carried by one of said rotors and controlled by centrifugal force and by a yielding element.

4. A hydraulic change speed gear, comprising a driving rotor, a driven rotor and a stator, said driving and driven rotors forming a rotary delivery pump device and said driven rotor and said stator forming a rotary receiving pump device, each of said pump devices comprising at least one pump element, at least one pressure channel forming a communication between said delivery pump device and said receiving pump device, a valve disposed in said pressure channel and controlled by the fluid pressure set up in said delivery pump device in overcoming the load to be driven and tending to open said valve, a spring device tending to close said valve, and means for automatically altering the said hydraulic control of said valve when one of the rotary members of the change speed gear exceeds a certain speed, so that said valve is caused by the said spring device to take up its closed position, said means comprising a valve device carried by said driven rotor and controlled by centrifugal force and by a spring element.

5. A hydraulic change speed gear, comprising a driving rotor, a driven rotor and a stator, said driving and driven rotors forming a rotary delivery pump device and said driven rotor and said stator forming a rotary receiving pump device, each of said pump devices comprising at least one pump element, at least one pressure channel forming a communication between said delivery pump device and said receiving pump device, a valve disposed in said pressure channel and controlled directly by the fluid pressure set up in said delivery pump device in overcoming the load to be driven and tending to open said valve, a spring device tending to close said valve, and means for automatically altering the said hydraulic control of said valve when one of the rotary members of the change speed gear exceeds a certain speed, so that said valve is caused by the said spring device to take up its closed position, said means comprising a valve device carried by said driven rotor and controlled directly by centrifugal force and by spring means.

6. A hydraulic change speed gear comprising a driving rotor, a driven rotor and a stator, said driving and driven rotors forming a sliding vane pump device acting as a delivery pump and one of said rotors and said stator forming a second sliding vane pump device acting as a receiving pump, each of said pump devices comprising at least one pump element, at least one pressure channel forming a communication between said delivery pump device and said receiving pump device, a valve disposed in said pressure channel and controlled by the fluid pressure set up in said delivery pump device in overcoming the load to be driven and tending to open said valve, a spring device tending to close said valve, and means for automatically altering the said hydraulic control of said valve when one of the rotary members of the change speed gear exceeds a certain speed, so that said valve is caused by the said spring device to take up its closed position, said means comprising a valve device carried by one of said rotors and controlled by centrifugal force and by spring means.

7. A hydraulic change speed gear comprising a driving rotor, a driven rotor and a stator, said driving and driven rotors forming a sliding vane pump device acting as a delivery pump and said driven rotor and said stator forming a second sliding vane pump device acting as a receiving pump, each of said pump devices comprising at least one pump element, at least one pressure channel forming a communication between said delivery pump device and said receiving pump device, a valve disposed in said pressure channel and controlled by the fluid pressure set up in said delivery pump device in overcoming the load to be driven and tending to open said valve, a spring device tending to close said valve, and means for automatically altering the said hydraulic control of said valve when said driven rotor of the change speed gear exceeds a certain speed, so that said valve is caused by the said spring device to take up its closed position, said means comprising a valve device carried by said driven rotor and controlled by centrifugal force and by spring means.

8. A hydraulic change speed gear comprising a driving rotor, a driven rotor and a stator, said driving and driven rotors forming a sliding vane pump device acting as a delivery pump and said driven rotor and said stator forming a second sliding vane pump device acting as a receiving pump, each of said pump devices comprising at least one pump element, at least one pressure channel forming a communication between said delivery pump device and said receiving pump device, a valve disposed in said pressure channel and controlled directly by the fluid pressure set up in said delivery pump device in overcoming the load to be driven and tending to open said valve, a spring device tending to close said valve, and means for automatically altering the said hydraulic control of said valve when said driven rotor of the change speed gear exceeds a certain speed, so that said valve is caused by the said spring device to take up its closed position, said means comprising a valve device carried by said driven rotor and controlled directly by centrifugal force and by spring means.

9. A hydraulic change speed gear, comprising a delivery pump device, a receiving pump device, conduits connecting said devices, a valve controlling the circulation of fluid between said devices, said valve being actuated hydraulically, a spring-ballasted auxiliary valve controlled by centrifugal force determined by the rotation of a part of the gear, said auxiliary valve being adapted to alter the hydraulic control of said hydraulically actuated valve.

10. A hydraulic change speed gear comprising delivery and receiving pumps, pressure and idle fluid conduits connecting said pumps, at least one hydraulically actuated valve controlling the flow of fluid between said pumps and means under the control of centrifugal force determined by the rotation of a part of the gear for altering the application of hydraulic pressure to actuate said valve.

11. A hydraulic change speed gear comprising a delivery pump device, a receiving pump device, conduits connecting said devices, a valve in at least one of said conduits for controlling the flow of fluid between said pump devices, hydraulic actuating means adapted to open and close said valve, and centrifugal governor means sensitive to the rotation of a part of the gear and adapted to control said hydraulic actuating means whereby the valve will be opened and closed in accordance with the speed of rotation of a part of the gear.

12. A hydraulic coupling and change speed gear having not less than two pumping stages and provided with pressure-sensitive main valve means for controlling the flow of fluid between said pumping stages, and auxiliary valve means adapted to control the said pressure-sensitive main valve means hydraulically.

13. A hydraulic coupling and change speed gear, according to claim 12 further characterized in that spring means tending to close the main valve are provided.

In testimony whereof I affix my signature.

SVEN GUSTAF WINGQUIST.